United States Patent [19]

Tamura

[11] 4,004,072
[45] * Jan. 18, 1977

[54] PROCESS FOR PRODUCING ACRYLONITRILE POLYMERS

[75] Inventor: Hitoshi Tamura, Otake, Japan

[73] Assignee: Mitsubishi Rayon Co., Ltd., Tokyo, Japan

[ * ] Notice: The portion of the term of this patent subsequent to Oct. 28, 1992, has been disclaimed.

[22] Filed: Mar. 26, 1975

[21] Appl. No.: 562,133

Related U.S. Application Data

[62] Division of Ser. No. 460,678, April 15, 1974, Pat. No. 3,915,942.

[30] Foreign Application Priority Data

May 1, 1973   Japan .............................. 48-49397

[52] U.S. Cl. .......................... 526/214; 260/79.3 M; 526/224; 526/317; 526/328; 526/341; 526/342
[51] Int. Cl.² ............... C08F 120/44; C08F 220/44
[58] Field of Search ................ 260/85.5 R, 85.5 D, 260/85.5 N, 88.7 RD; 526/214, 224, 341, 342

[56] References Cited

UNITED STATES PATENTS

| | | | |
|---|---|---|---|
| 2,605,256 | 7/1952 | Conard et al. | 260/85.5 N |
| 2,676,952 | 4/1954 | Ham | 260/85.5 R |
| 2,740,773 | 4/1956 | Ham | 260/85.5 N |
| 3,025,278 | 3/1962 | Pitts | 260/85.5 R |
| 3,028,372 | 4/1962 | Kocay et al. | 260/85.5 R |
| 3,123,588 | 3/1964 | Lunney | 260/85.5 R |
| 3,126,361 | 3/1964 | Glabisch et al. | 260/85.5 R |
| 3,213,069 | 10/1965 | Rausch | 260/85.5 N |
| 3,681,311 | 8/1972 | Patron et al. | 260/85.5 R |

*Primary Examiner*—Harry Wong, Jr.
*Attorney, Agent, or Firm*—Oblon, Fisher, Spivak, McClelland & Maier

[57] ABSTRACT

Acrylonitrile polymers of improved whiteness and thermal stability are provided by polymerizing acrylonitrile alone or with a comonomer in an aqueous medium, in the presence of a water-insoluble mercaptan, together with a redox catalyst comprising sulfurous acid or a salt thereof and nitrous acid or a salt thereof.

2 Claims, No Drawings

PROCESS FOR PRODUCING ACRYLONITRILE POLYMERS

This is a division of application Ser. No. 460,678, filed Apr. 15, 1974 and now U.S. Pat. No. 3,915,942.

BACKGROUND OF THE INVENTION

1. Field of the Invention

This invention relates to a process of polymerizing or copolymerizing acrylonitrile in an aqueous medium in the presence of a redox catalyst to produce an acrylonitrile homopolymer or copolymer of improved whiteness and thermal stability.

A catalyst combination of an oxidizing agent and a reducing agent, i.e., a redox catalyst, is widely used for polymerizing in an aqueous medium acrylonitrile or copolymerizing acrylonitrile with another copolymerizable monoethylenically unsaturated compounds. However, the acrylonitrile polymers and copolymers prepared by the polymerization in an aqueous medium in the presence of a redox catalyst are not always satisfactory because they are frequently characterized by poor whiteness and poor thermal stability.

It has now been found that when the polymerization or copolymerization of acrylonitrile is performed in the presence of a specified redox catalyst, which comprises sulfurous acid, or its salts and nitrous acid or its salts, and of a water-insoluble mercaptan, polymers or copolymers of acrylonitrile of improved whiteness and thermal stability are obtainable with advantage.

2. Description of Prior Art

In general, mercaptans act as chain transfer agents in the polymerization, and therefore are widely used as molecular weight controlling agents to produce a polymer of desirably lower molecular weight. It is already known, as disclosed in Japanese Patent Publication No. 1619/1968, that the addition of a water-soluble mercaptan to the polymerization system involving a particular redox catalyst will yield a polymer of improved whiteness and thermal stability.

However, the addition of a water-soluble mercaptan is not advantageous, because this inevitably reduces conversion and increases the degree of polymerization as substantiated in the Comparative Examples below, and referred to in the Japanese Patent Publication No. 1619/1968. The reduction in conversion leads to a reduction in productivity of polymers, and an increase in the cost of production. In order to control the increase in the degree of polymerization, it is necessary to use a greater amount of the catalyst. Further, the reduction of the conversion and the increase in the degree of polymerization make it difficult to ensure a stable operation. If a water-soluble mercaptan is employed in a far less amount, in order to minimize the disadvantages mentioned above, polymers of improved whiteness and thermal stability are not obtainable.

SUMMARY OF THE INVENTION

Accordingly, it is an object of the present invention to provide a process which enables the production of acrylonitrile polymers or copolymers having improved whiteness and thermal stability without the disadvantages mentioned above.

In accordance with the present invention there is provided a process for the production of acrylonitrile polymers or copolymers wherein acrylonitrile or a mixture comprising at least 85% by weight of acrylonitrile and at most 15% by weight of another copolymerizable monoethylenically unsaturated compound is polymerized in an aqueous medium, in the presence of a redox catalyst, comprising nitrous acid or a salt thereof, a sulfurous acid or a salt thereof, characterized in that said polymerization is performed in the presence of a waterinsoluble mercaptan.

The monomer to be polymerized by the process of this invention is acrylonitrile or a mixture of acrylonitrile and another comonomer. The mixture may contain at most 15% by weight of a monoethylenically unsaturated compound copolymerizable with acrylonitrile. Suitable monoethylenically unsaturated compound include, for example, vinyl compounds, such as vinyl acetate, vinyl chloride, vinylidene choride, acrylic acid and its esters, styrene, N-vinylsuccinimide, acrylamide, and vinylpyridine; and methacrylic acid and its esters, crotonic acid, and maleic anhydride.

The sulfurous acid or its salts, which constitute the other component of the redox catalyst used in the process of the present invention, include for example, sulfurous acid, sulfites such as sodium sulfite, potassium sulfite and ammonium sulfite; bisulfites such as sodium bisulfite, potassium bisulfite and ammonium bisulfite; and metabisulfites such as sodium metabisulfite and potassium metabisulfite. These sulfurous acid and salts are hereinafter referred to as "sulfurous compound" for brevity.

The nitrous acid or its salts, which constitute one component of the redox catalyst used in the process of the present invention, include for example nitrous acid and nitrites such as sodium nitrite, potassium nitrite and ammonium nitrite. These nitrous acid and their salts are hereinafter referred to as "nitrous compound" for brevity.

Hydroxylamine sulfonates or their salts, are prepared easily from nitrous acid or its salts and sulfurous acid or its salts, may be used as the nitrous compound component of the redox catalyst. By "salts thereof" is intended the soluble salts, such as the alkali or ammonium salts.

The ratio of the nitrous compound to the sulfurous compound is preferably 1/30 to ⅓ by weight, and more preferably 1/10 to 1/5 by weight. The sulfurous compound, should be present in an amount of preferably 1/10,000 to 1/50 by weight and more preferably 1/300 to 1/100 by weight based on the amount of water in the aqueous polymerization system. However, these amounts of the nitrous compound and the sulfurous compound are not critical, because the amount of a polymerization initiator may be suitably determined taking into consideration the polymerization apparatus employed, the characteristics of the resulting polymer, and costs.

The water insoluble mercaptans used in the process of the present invention, include alkylmercaptans, the alkyl group having at least 4 carbon atoms, such as n-butyl mercaptan, t-butyl mercaptan, t-dodecyl mercaptan and n-cetyl mercaptan; and esters of mercaptan carboxylic acids such as isopropyl thioglycolate and dodecyl thioglycolate.

The suitable amount of the water-insoluble mercaptans can vary depending upon the particular mercaptan employed. The presence of only a very small amount of mercaptan in the polymerization system produces some beneficial results. However, generally at least 0.005% by weight based on the weight of monomer should be employed in order to produce polymers of a relatively high degree of whiteness and thermal stability. While there is apparently no critical upper limit with regard to the amount of mercaptan used, at most about 5% by weight based on the weight of monomer should generally be employed. When the amount of mercaptan exceeds the upper limit, the degree of polymerization of the polymers becomes excessively low, and it becomes difficult to obtain a desired degree of polymerization, even if the amount of catalyst used is suitably varied.

The manner of addition of the mercaptan to the polymerization system is not critical. However, it is preferable to add the mercaptan in the form of solution, in the monomer which is to polymerized, since the mercaptan is insoluble in water but is readily soluble in the monomer to be polymerized. It is believed that the presence of the mercaptan exercises the function of improving whiteness and thermal stability in the form of being dissolved in the monomer.

The polymerization or copolymerization of the present invention is usually performed at a temperature of 30° to 70° C and a pH of 1.5 to 5.0.

The monomer/water ratio fed into the polymerization system should preferably to 1/10 to ⅓ by weight and more preferably 1/7 to 1/5. When the proportion excessively increases, it becomes difficult to remove the heat of polymerization and to prevent the polymer particles from depositing on the inner wall of the polymerization reactor and to uniformly agitate the polymerization mixture, although the amount of the catalyst used is reduced and the conversion and productivity are increased. Accordingly, the conditions, under which the polymerization or copolymerization is performed, should be determined based on the desired degree of polymerization or other physical properties of the polymer.

In the polymerization or copolymerization, suspension stabilizers, emulsifiers and coagulating agents may be employed, if required. The polymerization or copolymerization may be performed in either a continuous or batchwise manner.

The reason whiteness and thermal stability of the polymer are enhanced with only a slight reduction in the conversion and reduction in the degree of polymerization is assumed to be as follows: In general, it is accepted that when acrylonitrile is polymerized in an aqueous medium, monomers are adsorbed on the polymer particle produced in the aqueous medium and the monomers adsorbed are consumed by the polymerization, which phenomenon similarly occurs in bulk polymerization. Accordingly, if the mercaptans employed are water-soluble, the amount of the mercaptans incorporated in the monomers adsorbed on the polymer particle is small and, hence, only a small amount of chain transfer from growing polymer radicals to the mercaptans occurs. Therefore, the terminated polymer molecules have only a small amount of end groups stabilized with the mercaptans. In this instance, chain transfer from the catalyst to the mercaptans will inevitably occur because the catalyst is dissolved in water and, therefore, the catalyst radicals effective for the polymerization are undesirably decreased, which leads to a reduction in conversion and an increase in the degree of polymerization.

In contrast, when the mercaptans employed are water-insoluble, almost the total amount of the mercaptans will be present in the monomers adsorbed on the polymer particles and, hence, will contribute to the formation of end groups stabilized with the mercaptans. Chain transfer from the catalyst to the mercaptans does not substantially occur and, therefore, both the reduction in conversion and the increase in the degree of polymerization can be controlled.

Further, it is to be noted that water-insoluble mercaptans are only effective when they are employed together with the redox catalyst comprising the sulfurous compound and the nitrous compound. Water-insoluble mercaptans have little or no effectiveness when they are used together with typical redox catalysts such as those comprising persulfates and sulfites, as substantiated in Reference Example 2 described hereinafter. The reason for this is assumed to be that when such redox catalysts of enhanced activity are employed, the polymerization rate is too fast to permit the adsorption of monomer onto the growing polymer particles.

The water-insoluble mercaptans employed are not completely separated from the polymer in the step of filtration or washing after the completion of polymerization. Accordingly, a large amount of the water-insoluble mercaptans will remain in the finished polymer product. However, such water-insoluble mercaptans do not detrimentally influence the polymer. They may exert some advantageous effects on the polymer, for example, enhance the thermal stability of the polymer, although only to a slight extent, as seen in Reference Example 1 described hereinafter. It is to be noted, however, that advantageous effects produced by the process of the present invention are mainly due to the fact that waterinsoluble mercaptans are present in the polymerization system.

The invention is further illustrated by reference to the following examples in which parts and percentages are by weight unless otherwise indicated.

In the following examples, the reduced viscosity was measured as follows:

Principle

Reduced viscosity of polymer is determined by measuring the efflux time of a 0.2% polymer solution in dimethyl formamide (DMF) at 25° C using at Ostwald-Cannon-Fenski viscosimeter. The efflux time of the solvent is measured similarly, and the reduced viscosity can then be calculated.

EXAMPLE 1

Into a polymerization reactor, were charged first, 700 parts of water and, then, 0.6 parts of sodium nitrite, 6 parts of metabisulfite and 0.5 part of sodium methallylsulfonate. After these were dissolved, sulfuric acid was added to the solution to adjust the pH of the solution to 2.5. Then, a monomer mixture of 94 parts of acrylonitrile and 6 parts of methyl acrylate was added to the solution at a constant rate over a period of 80 minutes. The polymerization was performed at a temperature of 55° C under an atmosphere of air for 4 hours while the solution was stirred.

In Experiment No. 1, the polymerization was performed in the absence of mercaptan. In Experiments No. 2 and 3, the polymerization was performed in the presence of 0.1% and 0.2% of n-octyl mercaptan, based on the weight of the monomer mixture respectively. The n-octyl mercaptan was added in to the solution after being dissolved in a part of the monomer mixture. In Experiments No. 4 and 5, the polymerization was performed in the presence of 0.1% and 0.2% of thioglycolic acid, based on the weight of the monomer mixture, respectively. The thioglycolic acid was added in a manner similar to that in the case of n-octyl mercaptan.

After completion of the polymerization, the polymer so obtained was washed with a great amount of water and then dried. The polymer was found to have the degree of polymerization, the reduced viscosity and the absorbance as shown in Table I. The reduced viscosity was determined at 25° C in a solution of a concentration of 0.2 g per 100 cc of dimethylformamide. The absorbance was determined by maintaining a polymer solution of a 10% concentration in dimethylformamide at a temperature of 90° C for 90 minutes, and then measuring the absorbance at 430 m microns and 460 m microns.

EXAMPLE 2

700 parts of water was charged in a polymerization reactor. Sulfur dioxide gas was blown into the water until the amount of sulfurous acid dissolved therein reached 2 parts in terms of $SO_2$. To the aqueous solution, were added, first, 0.6 parts of sodium sulfite and, then sodium bicarbonate and sulfuric acid to adjust the pH of the aqueous solution to 2.5. Then, a monomer mixture of 94 parts of acrylonitrile and 6 parts of acrylic acid was added to the aqueous solution at a constant rate over a period of 80 minutes. The polymerization was performed at a temperature of 55° C under an atmosphere of air for 4 hours while the solution was stirred.

TABLE I

| Experiment No. | Mercaptan and its amount (%*) | Conversion (%) | Reduced Viscosity | Absorbance 430 m$\mu$ | Absorbance 460 m$\mu$ |
|---|---|---|---|---|---|
| 1 | — | 93.0 | 1.55 | 0.132 | 0.034 |
| 2 | n-Octyl mercaptan 0.1 | 92.3 | 1.54 | 0.071 | 0.039 |
| 3 | n-Octyl mercaptan 0.2 | 90.9 | 1.24 | 0.073 | 0.046 |
| 4 | Thioglycolic acid, | 85.4 | 2.39 | 0.075 | 0.050 |
| 5 | Thioglycolic acid, 0.2 | 73.2 | 2.57 | 0.060 | 0.039 |

Note
*based on the weight of monomer

As seen from Table I, n-octyl mercaptan, which is insoluble in water, results in a polymer of reduced color and improved whiteness, even when the amount of the mercaptan used is 0.1%, as compared with a polymer prepared without the addition of mercaptan. The reduction in conversion caused by the addition of n-octyl mercaptan is negligibly small. The reduced viscosity of the polymer obtained by the addition of n-octyl mercaptan is almost similar to that of the polymer prepared without the addition thereof when the amount of addition is 0.1%, and desirably lower when the amount of addition is 0.2%.

In contrast, thioglycolic acid, which is soluble in water, results in a polymer of reduced color but increased reduced viscosity with a reduced conversion.

In order to minimize or obviate such defects, tests were repeated wherein the amounts of thioglycolic acid used were varied. However, it was found to be impossible to reduce the whiteness without the reduction of conversion.

In Experiment No. 6, the polymerization was performed in the absence of mercaptan. In Experiments No. 7 and 8, 0.1% and 0.2% of n-dodecyl mercaptan were used, respectively.

In Experiments No. 9 and 10, 0.05% and 0.1% of 2-mercaptoethanol were used, respectively. All these mercaptans were added in the form of a solution dissolved in monomer.

After completion of the polymerization, the polymer so obtained was recovered and then tested in the same manner as in Example 1. Results are shown in Table II.

TABLE II

| Experiment No. | Mercaptan and its amount (%) | Conversion (%) | Reduced Viscosity | Absorbance at 430 m$\mu$ | Absorbance at 460 m$\mu$ |
|---|---|---|---|---|---|
| 6 | — | 93.5 | 1.53 | 0.136 | 0.085 |
| 7 | n-Dodecyl mercaptan, 0.1 | 92.5 | 1.54 | 0.083 | 0.052 |
| 8 | n-Dodecyl mercaptan, 0.2 | 91.1 | 1.30 | 0.084 | 0.053 |
| 9 | 2-Mercaptoethanol 0.05 | 87.0 | 1.84 | 0.080 | 0.050 |
| 10 | 2-Mercaptoethanol 0.1 | 83.0 | 1.90 | 0.074 | 0.049 |

As seen from Table II, n-dodecyl mercaptan which is insoluble in water and 2-mercaptoethanol which is soluble in water have functions similar to those of n-octyl mercaptan and thioglycolic acid, respectively, both of which were used in Example 1.

EXAMPLE 3

The procedure described in Example 1, Experiment No. 2 was repeated wherein various water-insoluble mercaptans were separately used in substitution for n-octyl mercaptan. Test results are shown in Table III.

TABLE III

| Experiment No. | Mercaptan | Conversion (%) | Reduced Viscosity | Absorbance at 430 mμ | Absorbance at 460 mμ |
|---|---|---|---|---|---|
| 11 | — | 93.0 | 1.55 | 0.132 | 0.084 |
| 12 | n-Butyl mercaptan | 91.4 | 1.53 | 0.089 | 0.056 |
| 13 | t-Butyl mercaptan | 91.7 | 1.44 | 0.087 | 0.050 |
| 14 | t-Dodecyl mercaptan | 92.9 | 1.49 | 0.090 | 0.051 |
| 15 | n-Cetyl mercaptan | 92.1 | 1.48 | 0.088 | 0.050 |
| 16 | Isopropyl thioglycolate | 91.3 | 1.44 | 0.099 | 0.069 |
| 17 | Dodecyl thioglycolate | 91.3 | 1.43 | 0.100 | 0.070 |

As seen from Table III, the addition of water-insoluble mercaptans improves the whiteness and suppresses the color formation without substantial influence to the conversion and the reduced viscosity.

EXAMPLE 4

Continuously added into a continuous polymerization reactor were 91 parts of acrylonitrile, 9 parts of vinyl acetate, 0.5 parts of sodium methallylsulfonate, 550 parts of water, 1 part of sodium hydroxylamine sulfonate, sodium metabisulfite and sulfuric acid. The amount of sodium metabisulfite was such that polymers contained in the polymerization mixture had a reduced viscosity of 1.65. The amount of sulfuric acid was such that the pH of the polymerization mixture was 2.5. The polymerization temperature was 55° C and average residence time was 8 hours. A polymer slurry continuously withdrawn from the reactor was washed with a great amount of water, dehydrated, dried and pulverized.

In the procedure described above, water was charged into the polymerization reactor in an amount of about two-thirds in volume of the polymerization reactor, followed by the addition of a part of the sodium hydroxylamine sulfonate and the sodium metabisulfite and, then, the sulfuric acid was added to adjust the pH of the aqueous solution to 2.5, before the monomer feed was introduced into the polymerization reactor, to prepare for the initiation of polymerization.

In Experiment No. 18, 0.08%, based on the weight of monomer, of n-octyl mercaptan was added in the form of a solution in the monomer mixture. In contrast, in Experiment No. 19, no mercaptan was employed. Tests results are shown in Table IV.

TABLE IV

| Experiment No. | Mercaptan and its amount (%) | Conversion (%) | Reduced Viscosity | Absorbance at 430 mμ | Absorbance at 460 mμ |
|---|---|---|---|---|---|
| 18 | n-Octyl mercaptan | 91.0 | 1.63 | 0.060 | 0.036 |
| 19 | — | 92.3 | 1.65 | 0.126 | 0.080 |

As seen from Table IV, the addition of n-octyl mercaptan reduces the color formation more than, and provides conversion and reduced viscosity substantially equal to, that obtained without the addition of mercaptan.

Filaments were prepared by a conventional procedure from the polymer mentioned above. The filaments from the polymer of Experiment No. 18 were found to be superior in whiteness and thermal stability to those from the polymer of Experiment No. 19.

The procedure of Example 4, Experiment No. 18, was repeated wherein sodium hydrogen sulfite was employed instead of sodium metabisulfite. Test results of the polymer was approximately the same as in Example 4, Experiment No. 18.

Reference Example 1

Solutions of n-octyl mercaptan in dimethylformamide having various concentrations were prepared. The polymer prepared in Example 4, Experiment No. 19, was dissolved in each of the n-octyl mercaptan solutions to form the polymer solution of a 10% concentration. Absorbance test was made on the 10% polymer solution. Results are shown in Table V. The results in Example 4, Experiment No. 4, are also shown in Table V for comparison purposes.

TABLE V

| Experiment No. | Concentration of n-octyl mercaptan (%*) | Absorbance at 430 mμ | Absorbance at 460 mμ |
|---|---|---|---|
| 19 | 0 | 0.126 | 0.080 |
| 20 | 0.01 | 0.126 | 0.080 |
| 21 | 0.05 | 0.120 | 0.079 |
| 22 | 0.1 | 0.110 | 0.070 |

Note
*based on the weight of the solution in dimethylformamide

As seen from Table V, in the case where n-octyl mercaptan is added to a polymer solution, the resulting solution exhibits improved thermal stability only to a slight extent as compared to the polymer solution containing no mercaptan. Accordingly, it may be concluded that water-insoluble mercaptans effectively function only during the polymerization and are ineffective when they are added after the polymerization.

Reference Example 2

240 parts of water was charged into a polymerization reactor followed by the addition of 0.00005 part, in terms of iron, of ferrous sulfate. Sulfuric acid was added to adjust the pH to 2.5. Then to the solution were added at a constant rate over a period of 70 minutes, a monomer mixture of 89.5 parts of acrylonitrile and 10.5 parts of vinyl acetate, an aqueous solution of 0.43 part of potassium persulfate and 1.07 parts of sodium hydrogen carbonate in 70 parts of water, and 70 parts of an aqueous sulfurous acid solution containing 0.98 part of $SO_2$ prepared by blowing sulfur dioxide gas into water. The polymerization was performed at a temperature of 50° C under an atmosphere of air for 1 hour and 40 minutes while the solution was stirred.

In Experiment No. 23, no mercaptan was added. In Experiment No. 24, 0.1%, based on the weight of monomer, of n-octyl mercaptan was added in the form of a solution in monomer.

After completion of the polymerization, the polymer so obtained was recovered and tested in the same manner as that in Example 1. Results are shown in Table VI.

TABLE VI

| Experiment No. | Mercaptan and its amount (%) | Conversion Viscosity | Reduced 430 mμ | Absorbance at 460 mμ | at |
|---|---|---|---|---|---|
| 23 | — | 87.7 | 1.88 | 0.172 | 0.110 |
| 24 | n-Octyl mercaptan 0.1 | 85.9 | 1.63 | 0.165 | 0.099 |

As seen from Table VI, the addition of n-octyl mercaptan to a redox catalyst system of potassium persulfate and sulfurous acid is not substantially effective for improving whiteness.

Having now fully described the invention, it will be apparent to one of ordinary skill in the art that many changes and modifications can be made thereto without departing from the spirit or scope of the invention as set forth herein.

What is claimed as new and intended to be secured by Letters patent of the United States is:

1. The acrylonitrile homopolymer or copolymer prepared by the process which comprises polymerizing acrylonitrile or a mixture comprising at least 85% by weight of acrylonitrile and at most 15% by weight of other copolymerizable monoethylenically unsaturated compounds in an aqueous medium at 30° C to 70° C at a pH of 1.5 – 5.0, wherein the monomer to water ratio is 1/10 to ⅓, in contact with a redox catalyst comprising nitrous acid or a salt thereof and sulfurous acid or salt thereof, wherein the ratio of said nitrous acid or salt to said sulfurous acid or salt thereof is 1/30 to ⅓ by weight, and the sulfurous acid or salt thereof is present in an amount of 1/10,000 to 1/50 by weight, based on the amount of water in the aqueous medium, and further in contact with 0.005%–5% by weight based on the weight of monomer of a water insoluble mercaptan selected from the group consisting of alkyl mercaptans containing at least 4 carbon atoms and mercaptan carboxylate acid ester.

2. The acrylonitrile homopolymer or copolymer of claim 1, wherein said sulfurous acid salt is selected from the group consisting of sulfites, bisulfites and metabisulfites.

* * * * *